Dec. 17, 1968   I. E. LAMB ET AL   3,417,240
METHOD OF TESTING TRANSPARENT MATERIALS
Filed Aug. 20, 1964
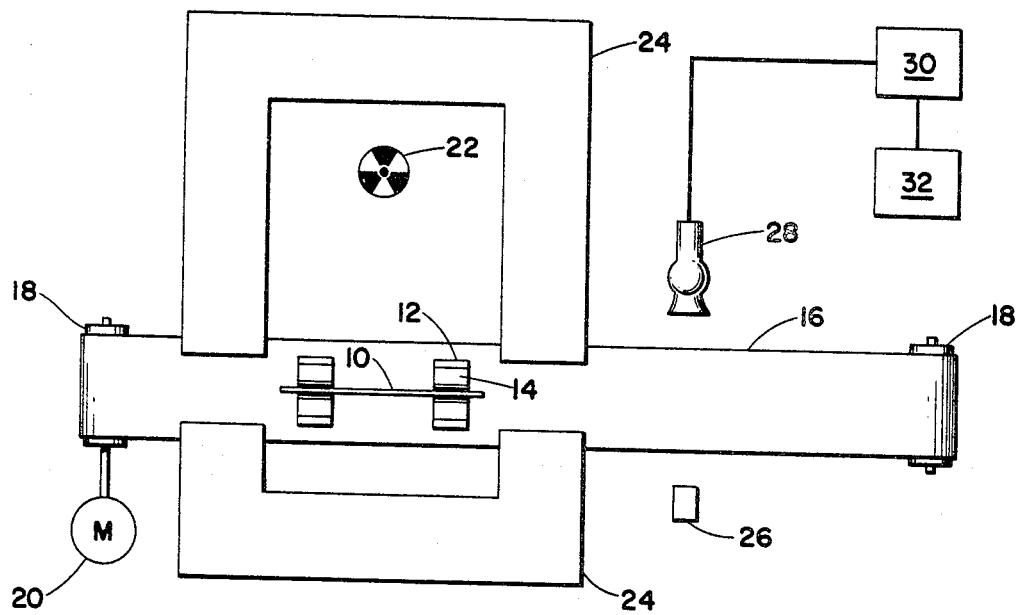
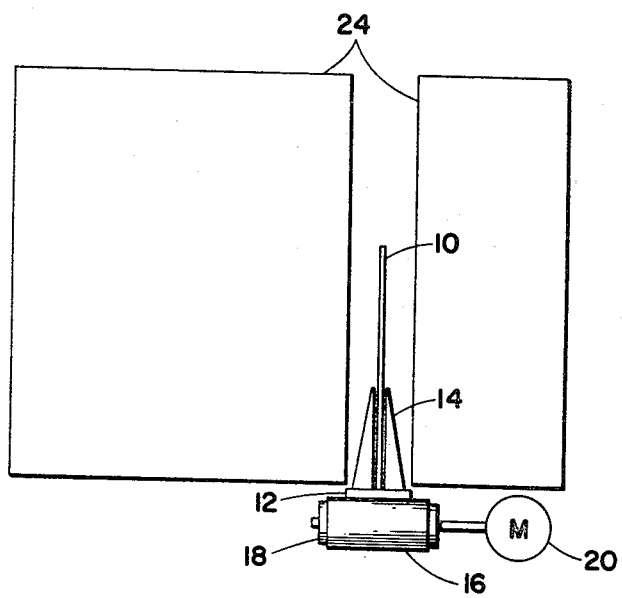
INVENTOR.
IRVIN E. LAMB
RANDALL W. HARMAN
BY
ATTORNEY   AGENT

3,417,240
METHOD OF TESTING TRANSPARENT MATERIALS
Irvin E. Lamb, Berkeley, and Randall W. Harman, Pleasanton, Calif., assignors, by mesne assignments, to Aerojet-General Corporation, El Monte, Calif., a corporation of Ohio
Filed Aug. 20, 1964, Ser. No. 390,920
4 Claims. (Cl. 250—71)

This invention relates to non-destructive testing methods generally and more particularly to a novel method and improved means for the non-destructive testing of transparent materials wherein ionizing radiation is used to fill the lattice imperfections of the material with trapped electrons which are subsequently excited to emit light photons.

From four to six times as much strength can be obtained in heat treated glass as compared to annealed glass. Due to this strength factor, heat treated glass is used in aircraft to obtain this higher strength to weight ratio. The degree of heat treatment in production quantities of glass is presently determined by process control and destructive sample testing. There is not presently any completely satisfactory production method for non-destructively determining the degree of heat treatment in glass or the anomalies in a plate. Such a method is imperative to increase the reliability of glass.

At the present time, polarized light can be used on the corners or edges of a sheet of glass to provide a qualitative measurement of the degree of temper, but this method cannot provide a measurement of the other areas of the sheet. Measurements of changes of modulus by the use of ultrasonics have not been successful due to the extremely small change in modulus due to heat treatment. Various optical methods, measurements of dielectric properties and light frequency, and variations in heat conductivity have largely proved unsuccessful.

It is therefore the object of this invention to provide a novel method of and improved means for the non-destructive testing of transparent materials wherein the light emitted by excited electrons artificially trapped in the lattice imperfections of the material by ionizing radiation is detected to indicate areas of lattice imperfections.

In its principal aspect, the present invention comprises the steps of exposing transparent material to penetrating ionizing radiation to fill the lattice imperfections of the material with trapped electrons, exciting these trapped electrons to emit light photons and detecting the pattern of light photons to indicate areas of lattice imperfections. This method utilizes the phenomena of luminescence exhibited by transparent materials such as glass. It can be used to indicate irregularities or stresses in any location in a glass plate.

These and other objects, advantages, and features of this invention will be apparent to those skilled in the art from the following description taken together with the appended drawings wherein:

FIG. 1 is a top plan view, schematic in form, of the non-destructive testing system for transparent materials, and FIG. 2 is a side elevation, schematic in form, of the non-destructive testing system of FIG. 1.

Luminescence is a physical process whereby a material generates non-thermal radiation which is characteristic of the material. All materials emit visible light as part of thermal radiation. For any given temperature however, the maximum thermal energy is given and fixed. By observation, considerably more light is sometimes emitted. The difference between the thermal radiant light and the total light is known as luminescence.

Although very few compounds or materials exhibit spontaneous luminescence, those compounds which have a crystalline structure exhibit measurable luminescence when heated (known as thermoluminescence) or when subjected to light waves (known as photoluminescence).

One simplified explanation which accurately describes the gross effect can be gained from the classical crystal model. Consider a perfect crystal structure where all atoms are in regular order. The electrons about each atom then have a number of well defined permitted energy levels between ground state and the conduction band. If, however, an atom is moved from its lattice location to an interstitial location, other electron energy levels are possible which would have been prohibited for a correctly oriented atom.

Some additional possible electron levels are of a metastable nature, that is, an electron that is "trapped" therein cannot return to the ground state without first receiving additional energy from outside. These metastable positions are called electron traps and are invariably associated with lattice imperfections. Normally, electrons in the conduction band can return to the ground state energy by emitting (as part of "black body" radiation) a photon of $h\mu$, but where an electron trap captures a free electron it is bound in that state until re-excited back into the conduction band where again it is free to return to ground by emitting a photon or to be recaptured by another trap.

An electron in the conduction band can normally emit a light photon, and return to the ground state. If, however, the returning electron is captured by a metastable trap, it is then held until enough energy is given it from outside to climb over the hill and then return to the ground emitting a visible photon. There is a finite probability, however, in quantum mechanics that the electron can tunnel through the trap wall but this perfection of the theory is not required to explain the operation of this proposed system.

The electron traps originate at the points of crystal imperfection. These imperfections can be caused by imperfect crystal growth, crystal or grain boundaries, mechanical fracturing of the crystal, atomic displacement by nuclear radiation, or stresses in the material.

Evidence of trapped electrons in glass has been demonstrated by the exposure of glass to high doses of gamma radiation. Nearly all glasses exhibit both thermo- and photoluminescence. The characteristic frequency and intensity are functions of the glass composition, condition, and history.

Under normal circumstances, however, only a small portion of the electron traps contain trapped electrons. By exposing the glass to a source of penetrating ionizing radiation such as gamma or X-rays, a much larger number of electrons are freed to fill the traps associated with the crystal imperfections. The level of radiation required to dislocate electrons is quite small, well below the radiation damage threshold, i.e., the point above which the material would suffer damage.

Since these electron traps exist primarily in areas of imperfections or stress, a measurement of the concentration and location of the photons emitted by the electrons freed from these traps will indicate where the areas of imperfections and stress are situated in the glass.

By subjecting the irradiated glass to either heat or light waves, the trapped electrons are excited and freed from the traps thereby emitting a light photon. These light photons can be detected by a suitable light measuring device such as a multiplier phototube or image orthicon. Since the glass is transparent, defects and stresses from all planes of the material, including the surface, can be detected.

Referring now to FIGS. 1 and 2, there is schematically shown a system for implementing the above described method for the non-destructive testing of transparent materials. A plate 10 of transparent material is supported on edge by a plurality of plate holders 12. Upward projecting arms 14 of the plate holders 12 maintain the plate 10 in an upright position. A conveyor belt 16 supported between two rollers 18, one of which is driven by a motor 20, positions the plate 10 of transparent material.

Positioned at one location along the conveyor belt 16 is a source 22 of gamma radiation or X-rays. An X-ray tube or radioactive isotope such as cerium-144, antimony-124, or cobalt-60 is a suitable source. Radiation shielding 24, of a radiation attenuating material such as lead, is provided around this position of the conveyor belt 16 to confine the radiation from the source 22 to this area. Alternately, the source 22 itself can be shielded to restrict the direction of its radiation.

An excitation source 26 is positioned at a second location along the conveyor belt 16. A heat source or light wave source would be suitable. Also at the second location along the conveyor belt 16 and on the other side thereof, substantially opposite the source 26, is a light detector 28 such as a multiplier phototube or image orthicon. The source 26 and/or the detector 28 can be equipped with filters to minimize the effects of extraneous or residual luminescence. The detector 28 is electrically connected to a signal monitor 30 such as a micromicroammeter or TV monitor. Additional signal analysis equipment 32, including a signal amplitude measuring device, an area integrating device (planimeter), or amplitude discriminator, can be utilized.

The conveyor belt 16, which is capable of both continuous and intermittent operation, first positions the plate 10 of transparent material in proximity to the radiation source 22. When exposed to the gamma rays for a reasonable time interval, a uniform dose per unit volume is obtained. This exposure fills the lattice imperfections of the material with electrons which are trapped therein.

These trapped electrons are excited when the plate 10 is advanced to the position in proximity to the excitation source 26. The light photons emitted by the excited electrons are received by the detector 28. Scanning of the plate 10 as it is advanced through this position will permit total area inspection of the plate 10. The output signal of the detector 28 can be measured by the monitor 30, thereby indicating areas of lattice imperfections in the plate.

While specific embodiments of the invention have been illustrated and described, it is to be understood that these embodiments are by way of example only and that the invention is not to be construed as being limited thereto, but only by the proper scope of the appended claims.

What is claimed is:
1. A non-destructive method of examining transparent material for imperfections, comprising
    subjecting the transparent material to penetrating ionizing radiation so as to fill any lattice imperfections in the transparent material with trapped electrons,
    exposing the transparent material to an electron-excitation source capable of exciting any electrons trapped in lattice imperfections therein so as to cause light photons to be emitted from such electrons, and
    determining any areas of lattice imperfections in the transparent material by detecting any light photons emitted by electrons excited by the electron-excitation source to which the transparent material is exposed.

2. A non-destructive method of examining transparent material for imperfections, comprising
    subjecting the transparent material to penetrating ionizing radiation so as to fill any lattice imperfections in the transparent material with trapped electrons,
    heating the transparent material for exciting any electrons trapped in lattice imperfections therein so as to cause light photons to be emitted from such electrons, and
    determining any areas of lattice imperfections in the transparent material by detecting any light photons emitted by electrons excited by the heating of the transparent material.

3. A non-destructive method of examining transparent material for imperfections, comprising
    subjecting the transparent material to penetrating ionizing radiation so as to fill any lattice imperfections in the transparent material with trapped electrons,
    exposing the transparent material to light waves capable of exciting any electrons trapped in lattice imperfections therein so as to cause light photons to be emitted from such electrons, and
    determining any areas of lattice imperfections in the transparent material by detecting any light photons emitted by electrons excited by the light waves to which the transparent material is exposed.

4. A non-destructive method of examining transparent sheet material for imperfections, comprising
    subjecting the transparent sheet material to penetrating ionizing radiation so as to fill any lattice imperfections in the transparent sheet material with trapped electrons,
    exposing the transparent sheet material to an electron-excitation source capable of exciting any electrons trapped in lattice imperfections therein so as to cause light photons to be emitted from such electrons, and
    inspecting the transparent sheet material for areas of lattice imperfections therein by scanning the transparent sheet material with a light detector so as to detect any light photons emitted by electrons excited by the electron-excitation source to which the transparent sheet material is exposed.

References Cited

UNITED STATES PATENTS

| 2,756,343 | 7/1956 | Johnson | 250—71 |
| 2,830,969 | 4/1958 | Zoubek | 250—83 |
| 2,935,613 | 5/1960 | Tirico | 250—83 |
| 3,188,467 | 6/1965 | Weissenberg | 250—71 |

ARCHIE R. BORCHELT, *Primary Examiner.*

U.S. Cl. X.R.

250—83.3